United States Patent
Yako et al.

(10) Patent No.: US 9,903,474 B2
(45) Date of Patent: Feb. 27, 2018

(54) SEAL DEVICE

(71) Applicant: KABUSHIKI KAISHA RIKEN, Tokyo (JP)

(72) Inventors: Nagato Yako, Kashiwazaki (JP); Takashi Shinada, Kashiwazaki (JP); Jun Fukada, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/780,337

(22) PCT Filed: Mar. 18, 2014

(86) PCT No.: PCT/JP2014/057296
§ 371 (c)(1),
(2) Date: Sep. 25, 2015

(87) PCT Pub. No.: WO2014/156820
PCT Pub. Date: Oct. 2, 2014

(65) Prior Publication Data
US 2016/0033044 A1    Feb. 4, 2016

(30) Foreign Application Priority Data

Mar. 27, 2013 (JP) .................. 2013-065582

(51) Int. Cl.
*F16J 15/16* (2006.01)
*F16J 15/24* (2006.01)
(Continued)

(52) U.S. Cl.
CPC ............. *F16J 15/18* (2013.01); *F16J 15/164* (2013.01); *F16J 15/24* (2013.01); *F16J 15/3212* (2013.01);
(Continued)

(58) Field of Classification Search
CPC ...... F16J 9/061; F16J 9/062; F16J 9/28; F16J 15/164; F16J 15/3208; F16J 15/3212; F16J 15/56
(Continued)

(56) References Cited

U.S. PATENT DOCUMENTS 1,489,464 A * 4/1924 Small ..................... F16J 9/06
  277/445
3,057,630 A * 10/1962 Sneed ................. F16J 15/3208
  277/436

(Continued)

FOREIGN PATENT DOCUMENTS

GB           866665 A    4/1961
JP       53-146855 U    11/1978
(Continued)

OTHER PUBLICATIONS

Extended European Search Report dated Oct. 14, 2016, for European Application No. 14776446.8.
(Continued)

*Primary Examiner* — Nicholas L Foster
(74) *Attorney, Agent, or Firm* — Birch, Stewart, Kolasch & Birch, LLP

(57) ABSTRACT

There is provided a seal device having a seal ring structure assemblable without lowering the assembling efficiency of CVT, and free from oil leakage when an oil pump is not operated with an engine stopped, namely when oil pressure is not applied to the seal ring, which comprises a combined seal ring comprising an endless resin ring having an outer peripheral surface in slidable contact with an inner peripheral surface of an outer member, and a coil expander pushing the resin ring toward its outer peripheral surface and side surface, the coil expander being arranged in a corner recess portion of the resin ring between its pressure-receiving side surface and its inner peripheral surface, and an inner periph- (Continued)

eral side of the combined seal ring being separate from a bottom of the seal ring groove.

9 Claims, 4 Drawing Sheets

(51) Int. Cl.
    *F16J 15/32*     (2016.01)
    *F16J 9/28*     (2006.01)
    *F16J 15/56*     (2006.01)
    *F16J 9/06*     (2006.01)
    *F16J 15/18*     (2006.01)
    *F16J 15/3212*     (2016.01)

(52) U.S. Cl.
    CPC ............... *F16J 15/56* (2013.01); *F16J 9/062* (2013.01); *F16J 9/28* (2013.01)

(58) Field of Classification Search
    USPC .................................................. 277/448, 589
    See application file for complete search history.

(56) References Cited

U.S. PATENT DOCUMENTS

| | | | | |
|---|---|---|---|---|
| 3,450,411 A * | 6/1969 | Skinner, Sr. | ......... | F16J 15/3204 123/188.1 |
| 3,717,293 A * | 2/1973 | Traub | ...................... | F16J 15/56 277/589 |
| 4,560,174 A * | 12/1985 | Bisi | ...................... | B62D 55/088 277/382 |
| 4,681,327 A * | 7/1987 | d'Agostino | ............. | F02C 7/232 277/587 |
| 4,911,455 A * | 3/1990 | Edlund | ................ | F16J 15/3208 277/589 |
| 5,249,813 A * | 10/1993 | Botto | ................... | F16J 15/3208 277/556 |
| 5,292,138 A * | 3/1994 | Glynn | .................... | F16J 15/164 277/422 |
| 5,743,535 A * | 4/1998 | Hodgins | .................... | F16J 9/06 277/434 |
| 6,257,590 B1 * | 7/2001 | Kumai | ..................... | F16J 9/062 277/435 |
| 6,283,478 B1 * | 9/2001 | Kumai | ..................... | F16J 9/062 277/435 |
| 9,267,441 B1 * | 2/2016 | Ellwood, III | ........... | F04D 29/10 |
| 9,752,679 B2 * | 9/2017 | Urac | .......................... | F16J 9/06 |
| 2004/0232623 A1 * | 11/2004 | Panelli | .................... | F16J 9/061 277/459 |
| 2005/0001423 A1 * | 1/2005 | Vila | ..................... | F16J 15/3212 285/223 |
| 2009/0108542 A1 * | 4/2009 | Jordan | ................. | F16J 15/3208 277/589 |
| 2011/0012312 A1 * | 1/2011 | Zitting | ................... | F16J 15/164 277/500 |
| 2012/0032405 A1 * | 2/2012 | Nishizawa | .............. | F16H 55/56 277/505 |
| 2014/0031475 A1 * | 1/2014 | Ito | ........................ | F16J 15/3208 524/406 |
| 2015/0087785 A1 * | 3/2015 | Oowada | .................. | C08L 21/00 525/190 |
| 2015/0362074 A1 * | 12/2015 | Seki | ........................ | F16J 15/24 277/512 |

FOREIGN PATENT DOCUMENTS

| | | |
|---|---|---|
| JP | 62-52258 U | 4/1987 |
| JP | 2005-264978 A | 9/2005 |
| JP | 2007-32446 A | 2/2007 |
| JP | 2008-190643 A | 8/2008 |
| JP | 2008-190650 A | 8/2008 |
| JP | 2011-144847 A | 7/2011 |

OTHER PUBLICATIONS

International Preliminary Report on Patentability and English translation of the Written Opinion of the International Searching Authority issued in the corresponding International Application No. PCT/JP2014/057296 dated Oct. 8, 2015.

* cited by examiner

SEAL DEVICE

FIELD OF THE INVENTION

The present invention relates to a seal device reciprocally sliding in belt-type, continuously variable transmissions (CVT), compressors, etc.

BACKGROUND OF THE INVENTION

In CVT, for example, a pair of pulleys are attached to a driving rotation shaft and a driven rotation shaft, and an endless belt engages both pulleys to connect both rotation shafts. The driving pulley has a variable sheave and a fixed sheave, and the driven pulley also has a variable sheave and a fixed sheave. An oil chambers is mounted to the variable sheave of the pulley attached to each of the driving and driven shafts. By operation pressure applied to each oil chamber, the variable sheaves of both pulleys move axially, varying the groove widths of both pulleys for controlled speed change. A seal ring is disposed in a seal ring groove of an outer peripheral surface of an annular inner member (for example, a partition member constituting the oil chamber on the rear surface side of the variable sheave). The seal ring has a side surface and an inner peripheral surface for receiving the pressure of an oil supplied from an oil pump, and an opposite side surface and an outer peripheral surface for securing sealing between the side surface of the seal ring groove and an inner peripheral surface of an outer member (for example, a cylindrical portion of the variable sheave). The inner member and the outer member are slidable via the seal ring to change the groove width of the pulley. Namely, the outer peripheral surface of the seal ring is axially slidable to the inner peripheral surface of the outer member.

Required to provide the seal ring with excellent sealability are strict specifications, such as improved durability and reliability for higher performance of engines, the size and weight reduction of oil pumps for energy saving, and stabilized oil leakage for more accurate electronic control. An ultimate target is to avoid oil leakage even in a state where an oil pump is not operated by the stop of an engine (oil pressure is not applied to the seal ring).

For example, as shown in FIG. 8, a combination of a gap-free endless seal ring 101 of polytetrafluoroethylene (PTFE) and an O-ring 102 of a synthetic rubber can make oil leakage zero, in a state where oil pressure is not applied. However, the above seal ring suffers the following disadvantages in the assembling efficiency of CVT. Two operations should be carried out to expand both O-ring and PTFE seal ring separately to assemble them in a groove from an end of the inner member. Also, the diameter reduction of the PTFE seal ring to be inserted into the outer member is not easy because of the O-ring disposed inside, resulting in an extremely inefficient assembling step.

Attempts to improve the assemblability of a gap-free seal ring in a groove of an inner member are proposed by JP 2008-190643 A and JP 2008-190650 A. JP 2008-190643 A discloses an endless seal ring having pluralities of axially slanting ridges extending on its inner peripheral surface, tip ends of these ridges being in contact with a sealing groove bottom, and each ridge being circumferentially deformed when passing a sealing groove edge, thereby making it easy to assemble the endless seal ring to the sealing groove. JP 2008-190650 A discloses a seal ring having an outer portion made of a resin and an inner portion made of an elastic material, the inner elastic material portion intruding into the outer resin portion, such that the outer resin portion having large deformation resistance has a small cross section area, while the inner portion of an easily deformable elastic material has a large cross section area, for improved assemblability.

However, because each seal ring of JP 2008-190643 A and JP 2008-190650 A is designed to have an inner peripheral surface in contact with a sealing groove bottom, there is large assembling resistance when the seal ring is inserted into the outer member, though the seal ring can be easily assembled in the inner member groove. Thus, a special jig should be devised, and there actually remain a lot of problems to be solved.

Object of the Invention

To solve the above problems, an object of the present invention is to provide a seal device having a seal ring structure easily assemblable without reducing the assembling efficiency of CVT, and free from oil leakage even in a state where an oil pump is not operated by the stop of an engine (oil pressure is not applied to the seal ring).

DISCLOSURE OF THE INVENTION

The present invention basically uses a gap-free endless resin ring, and a coil expander for applying tension to the resin ring, to achieve no oil leakage. Accordingly, their assemblability and sealability with an outer member are important. As a result of intensive research, the inventors have found that with a seal ring separate from a bottom of a seal ring groove, and a coil expander disposed to apply its expansion tension to push the resin ring not only toward its outer peripheral surface but also toward its side surface, their efficient assembling is achieved, providing a seal device free from oil leakage even in a state where oil pressure is not applied to the seal ring.

Thus, the seal device of the present invention comprises a combined seal ring disposed in a seal ring groove of an outer peripheral surface of an annular inner member opposing an inner peripheral surface of an annular outer member, to achieve oil seal between the outer member and the inner member;

the combined seal ring comprising an endless resin ring having an outer peripheral surface in slidable contact with the inner peripheral surface of the outer member, and a coil expander pushing the resin ring toward its outer peripheral surface and its side surface;

the coil expander being arranged in a corner recess portion of the resin ring between its pressure-receiving side surface and its inner peripheral surface; and an inner peripheral side of the combined seal ring being separate from a bottom of the seal ring groove.

The resin ring is preferably made of a fluororesin.

The inner diameter of the resin ring is preferably 95-99.5% of the diameter of the inner member.

The recess portion receiving the coil expander is preferably arcuate.

The recess portion is preferably constituted by pluralities of surfaces, at least one surface being axially inclined from the resin ring, and the coil expander being in contact with the inclined surface. Among pluralities of the surfaces, there is preferably a surface axially parallel and/or perpendicular to the resin ring.

The coil expander is preferably disposed on the outer peripheral surface side than the inner peripheral surface of the resin ring. In other words, the coil expander preferably does not project from the inner peripheral surface of the resin ring.

The opening width of the recess portion on the inner peripheral surface side is preferably 75% or less of the width h1 of the resin ring.

DESCRIPTION OF THE PREFERRED EMBODIMENTS

Figure 1:
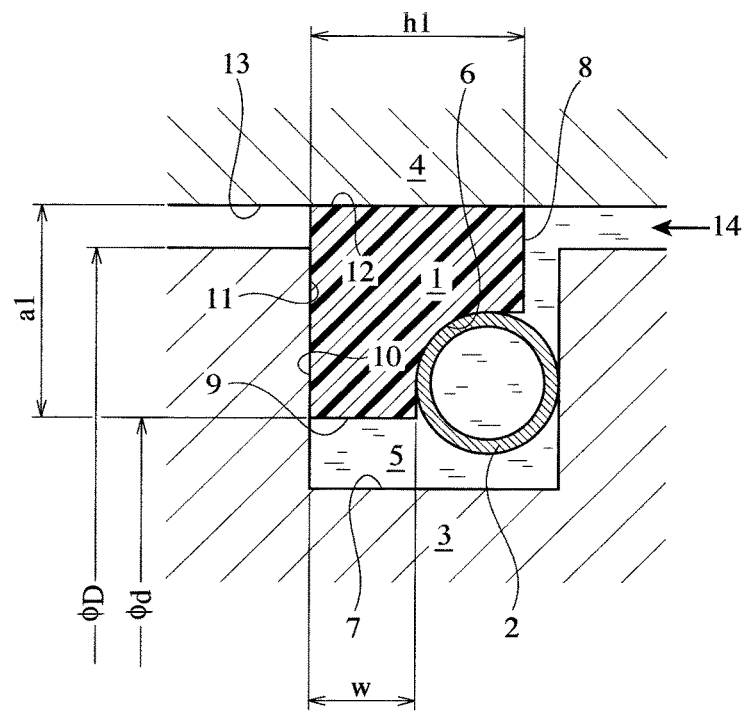
FIG. 1 is a cross-sectional view showing an example of the seal devices of the present invention.

FIG. 1 shows an example of the seal devices of the present invention. A combined seal ring, which is disposed in a seal ring groove 5 of an inner member 3, comprises a gap-free endless resin ring 1 having good slidability, and a coil expander 2 arranged in a corner recess portion of the resin ring 1 between its pressure-receiving side surface and its inner peripheral surface for pushing the resin ring 1 toward its outer peripheral surface and its side surface. The recess portion is an arcuate recess. The outer peripheral surface 12 of the resin ring 1 is in contact with an inner peripheral surface 13 of the outer member 4, and the side surface 10 of the resin ring 1 is in contact with the side wall 11 of the seal ring groove 5.

When an oil pump (not shown) is operated to pressurize an oil 14, the resin ring 1 is pushed to the side wall 11 of the seal ring groove and the inner peripheral surface 13 of the outer member 4, exhibiting sufficient sealability. After the operation of the oil pump is stopped, the outer peripheral surface 12 and side surface 10 of the resin ring 1 remain contacting with the inner peripheral surface 13 of the outer member 4 and the side wall 11 of the seal ring groove 5, so that by the action of the coil expander 2, the resin ring 1 remains pushed to the inner peripheral surface 13 of the outer member 4 and the side wall 11 of the seal ring groove 5 of the inner member 3. The pushing action of the coil expander 2 enables the seal device of the present invention to avoid oil leakage, even in a state where oil pressure is not applied.

The inner peripheral surface 9 of the resin ring 1 is separate from a bottom 7 of the seal ring groove 5 of the inner member 3, even in the combined seal ring comprising the coil expander 2. Accordingly, the resin ring 1 and the coil expander 2 need only be slightly expanded, when they are assembled to the seal ring groove 5, resulting in good assemblability. Of course, when the inner member 3 comprising the combined seal ring is assembled to the outer member 4, too, the combined seal ring can be easily reduced in diameter for good assemblability, because an inner peripheral side of the combined seal ring is separate from the groove bottom 7 of the seal ring groove 5.

The inner peripheral surface 9 of the resin ring 1 is separate from the bottom 7 of the seal ring groove 5 to make it easy to achieve the diameter reduction of the resin ring 1 as described above, but it would be difficult to insert the inner member 3, to which the coil expander 2 and the resin ring 1 are attached, into the outer member 4, if the coil expander 2 were completely pushed out of the groove 5 when the resin ring 1 was pushed to the bottom 7 of the seal ring groove 5. To avoid such troubles, namely, to prevent the coil expander 2 from being completely pushed out of the groove 5, the resin ring 1 should have thickness a1. A portion of the resin ring 1 defined by a side surface 11, an inner peripheral surface 9 and a recess surface 6 (21) may be called "leg portion." The leg portion of the resin ring 1 preferably prevents the coil expander 2 from riding on the inner peripheral surface 9 of the resin ring 1.

Figure 2:
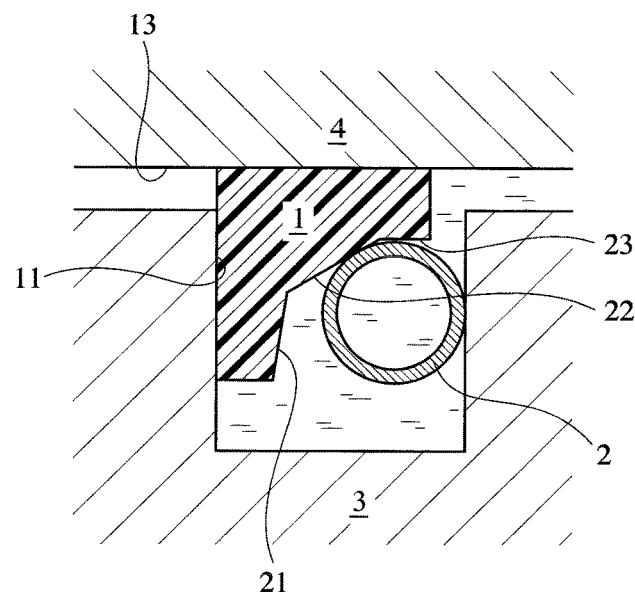
FIG. 2 is a cross-sectional view showing another example of the seal devices of the present invention.

FIG. 2 shows another example of the seal devices of the present invention. A recess portion receiving a coil expander 2 is constituted by pluralities of surfaces 21, 22, 23. The surfaces 21 and 22 are axially inclined from the resin ring 1, and the surface 23 is axially parallel with the resin ring 1. The coil expander 2 abuts the inclined surface 22 to push the resin ring 1 not only to the inner peripheral surface 13 of the outer member 4 but also to the side wall 11 of the seal ring groove 5 of the inner member 3. The axial inclination angle of the inclined surface 22 is preferably 15-45°, more preferably 25-35°.

Figure 3:
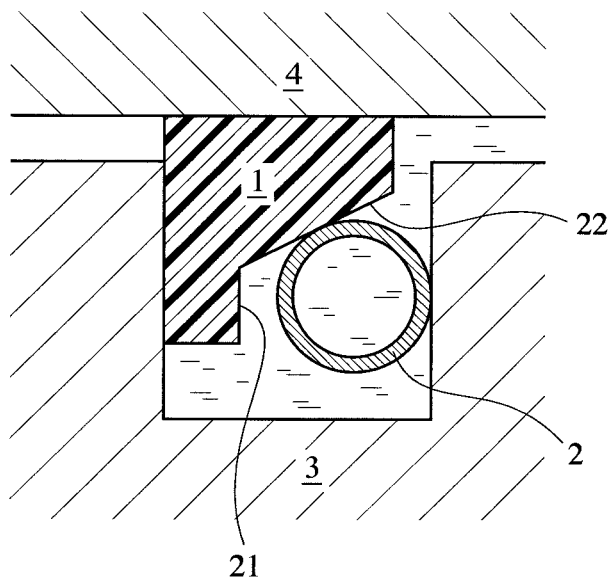
FIG. 3 is a cross-sectional view showing a further example of the seal devices of the present invention.

FIG. 3 shows a further example of the seal devices of the present invention. A recess portion is constituted by two surfaces 21 and 22. With pluralities of surfaces axially parallel or perpendicular to the resin ring 1, the resin ring 1 is effectively pressed to the outer peripheral surface and the side surface by oil pressure.

Figure 4:
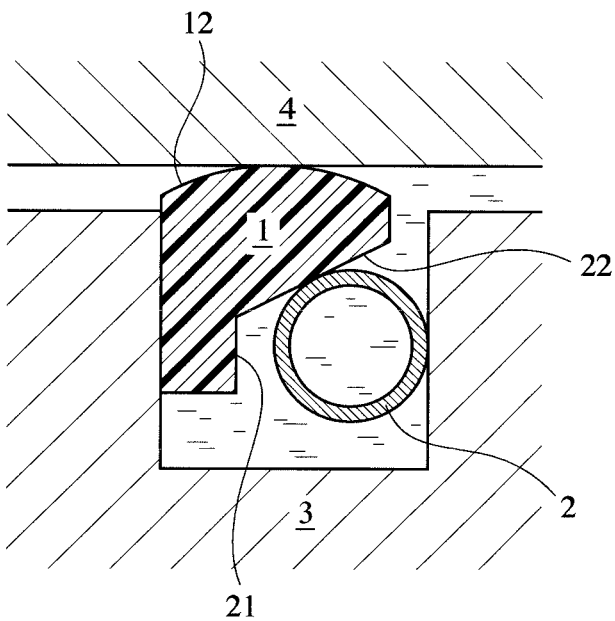
FIG. 4 is a cross-sectional view showing a still further example of the seal devices of the present invention.

The outer peripheral surface 12 of the resin ring 1 is axially slidable on the inner peripheral surface 13 of the outer member 4. To secure a sufficient sliding area with small friction, the resin ring 1 preferably has an arcuate outer peripheral surface 12 in cross section. An example having an arcuate outer peripheral surface 12 is shown in FIG. 4.

Figure 5:
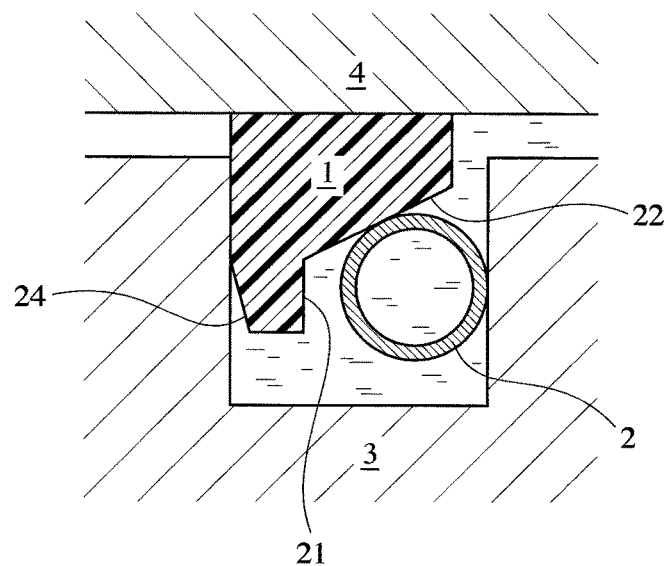
FIG. 5 is a cross-sectional view showing a still further example of the seal devices of the present invention.

A force of pushing the coil expander 2 to the outer peripheral surface and side surface of the resin ring 1 depends on the expansion of the coil expander 2 and the angle of the inclined surface 22. For example, the pushing force to the side surface can be adjusted by slightly inclining a portion 24 of the side surface 10 on the inner peripheral surface side as shown in FIG. 5.

The resin ring used in the present invention is preferably made of engineering plastics, such as PTFE, polyetheretherketone (PEEK), etc. having excellent slidability, heat resistance, etc., which are reinforced by carbon, carbon fibers, etc. Particularly, fluororesins having elastic deformation of several % at room temperature are preferably usable for an expandable gap-free endless ring. For example, when the resin ring has an inner diameter d in a range of 95% or more of the diameter D of the inner member, the resin ring is preferably expandable without plastic deformation. Taking into consideration the sealability of the seal ring groove with the side wall, it is preferably 99.5% or less. Such fluororesins may be, for example, polytetrafluoroethylene (PTFE), tetrafluoroethylene-perfluoroalkylvinyl ether copolymers (PFA), tetrafluoroethylene-ethylene copolymers (ETFE), polyvinylidene difluoride (PVDF), etc.

Figure 6:
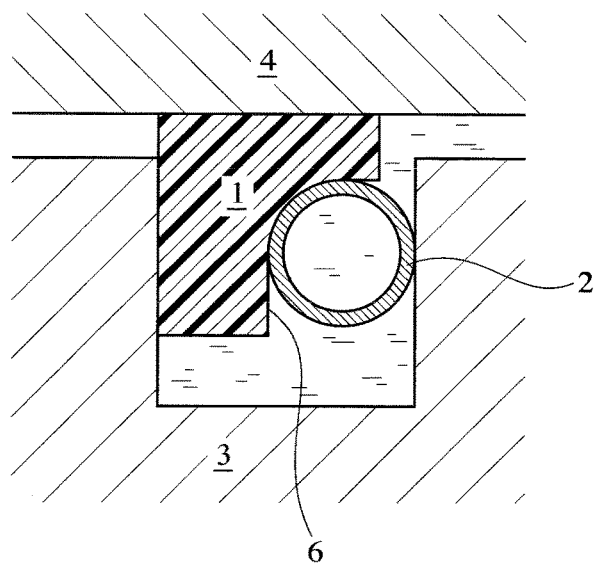
FIG. 6 is a cross-sectional view showing a still further example of the seal devices of the present invention.

The coil expander 2 in the combined seal ring used in the present invention is preferably formed by a carbon steel wire of JIS SWPA77, an oil-tempered silicon-chromium steel wire of SWOSC-V, an austenitic stainless steel wire of SUS304, etc. The length of the coil expander 2 is preferably adjusted to have proper tension for a combined seal ring. As shown in FIG. 6, the coil expander is preferably disposed in the recess portion of the resin ring on the outer peripheral surface side of the resin ring, such that the coil expander does not project from the inner peripheral surface of the resin ring.

A seal ring for CVT is subjected to thermal hysteresis depending on the temperature of a CVT oil. By use in a frigid climate and sudden temperature elevation, etc., the seal ring undergoes temperatures ranging from −30° C. to 120° C. When a fluororesin ring is subjected to such thermal hysteresis, sealing between the resin ring and the side wall of the seal ring groove would be lost by thermal deformation if the resin ring had a thin leg portion. From this aspect, the opening width w of the recess portion of the resin ring on the inner peripheral surface side is preferably 75% or less of the width h1 of the resin ring. Of course, the opening width w may exceed 75% of the width h1 of the resin ring, unless the seal ring undergoes extreme thermal hysteresis.

Example 1

A gap-free endless resin ring was formed by a carbon-reinforced PTFE resin. The resin ring had an outer diameter (nominal diameter) of 114.5 mm, a thickness (radial width) a1 of 3.2 mm, and a width (axial width) h1 of 2.7 mm. The resultant resin ring was provided with a recess portion having a cross section shown in FIG. 1 with a radius of curvature of 0.8 mm, and an opening width w of 1.0 mm on the inner peripheral surface side. A coil expander having a wound diameter of 1.5 mm and a free-state pitch of 1.65 mm, with tension of 10 N when combined with the resin ring, was formed by a SWOSC-V wire of 0.6 mm in diameter.

Leak Test

Figure 7:
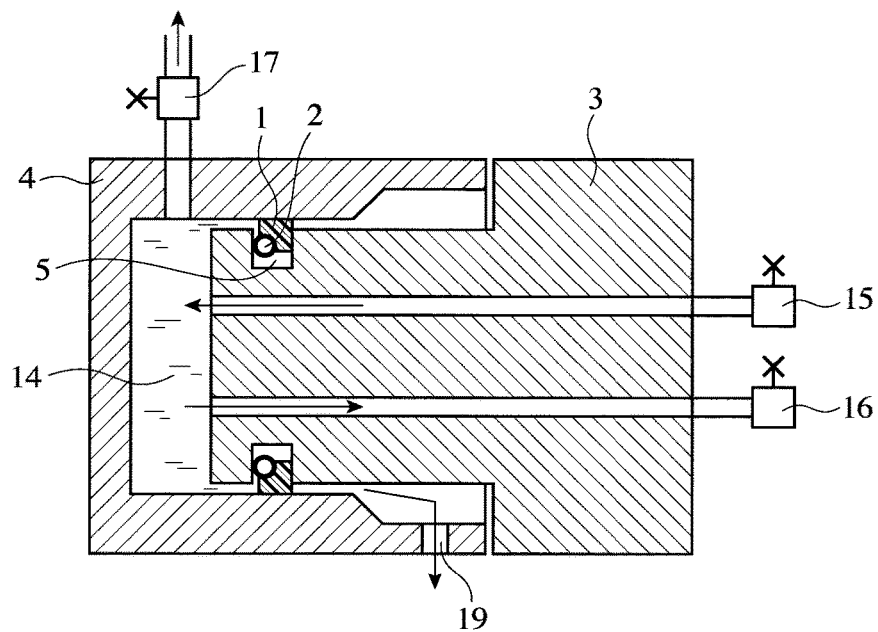
FIG. 7 is a schematic view showing an oil leak test machine.
Figure 8:
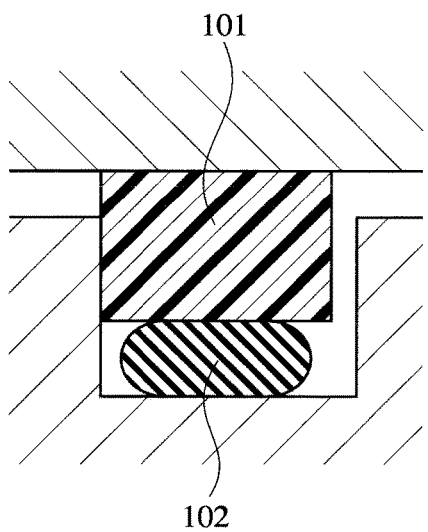
FIG. 8 is a view showing a conventional seal device comprising a gap-free PTFE seal ring combined with a synthetic-rubber-made O-ring.

The leak test was conducted by using a leak test machine schematically shown in FIG. 7. A combined seal ring produced was disposed in a seal ring groove 5 of an inner member 3 and inserted into an outer member 4. The inner member 3 in the leak test machine has a diameter of 113.4 mm, the outer member 4 has an inner diameter of 114.7 mm, and the seal ring groove has a groove bottom diameter of 107.9 mm and a groove width of 2.8 mm. In the test, a valve 15 was opened to introduce oil into an oil chamber to pressure of 1 MPa, and a valve 17 was opened to withdraw air. After closing the valve 17, the valve 15 was closed to seal the oil chamber, and the valve 17 was then opened to lower the pressure of the oil chamber to atmospheric pressure (0 MPa), to measure the amount of oil leaking from an exit 19. After subjecting the seal ring to thermal hysteresis, in which the temperature was kept at 120° C. for a certain period of time and then lowered to −30° C., the amount of leaking oil was also measured. The thermal hysteresis was given by elevating and lowering the temperature while circulating oil by opening the valves 15 and 16. As a result, the combined seal ring of Example 1 suffered no leakage before and after thermal hysteresis.

Example 2

A combined seal ring was produced in the same manner as in Example 1, except for using a resin ring 1 having a recess portion constituted by three surfaces 21, 22, 23 as shown in FIG. 2. A recess portion had an opening width w of 2.0 mm (74% of h1) on the inner peripheral surface side, the surface 23 being axially parallel to the resin ring 1 and as long as 0.9 mm, the surface 22 having an inclination angle of 30°, and the surface 21 having an inclination angle of 80°. In the same leak test as in Example 1, no leakage was observed at all before and after thermal hysteresis.

Effect of the Invention

Because the seal device of the present invention comprises a gap-free endless resin ring, whose inner peripheral side is separate from a bottom of a seal ring groove, the resin ring can be easily disposed in the seal ring groove with suppressed diameter expansion of the resin ring. By disposing the coil expander pushing the resin ring toward its outer peripheral surface side and its side surface in a corner portion of the resin ring between its pressure-receiving side surface and its inner peripheral surface, oil leakage can be avoided even in a state where oil pressure is not applied to the resin ring.

What is claimed is:
1. A seal device comprising a combined seal ring disposed in a seal ring groove of an outer peripheral surface of an annular inner member opposing an inner peripheral surface of an annular outer member, to achieve an oil seal between said outer member and said inner member;
   said combined seal ring comprising an endless resin ring having an outer peripheral surface in slidable contact with the inner peripheral surface of the outer member, and a coil expander pushing said resin ring toward its outer peripheral surface and a side surface;
   said coil expander being arranged in a corner recess portion of said resin ring between a pressure-receiving side surface and an inner peripheral surface of said resin ring;
   the inner peripheral surface of said resin ring facing a bottom of said seal ring groove; and
   a most inner peripheral side of said combined seal ring facing but being apart from the bottom of said seal ring groove,
   wherein the corner recess portion is a recess which adjoins the pressure-receiving side surface but is spaced from a side surface of the resin ring opposite the pressure-receiving side surface,
   wherein said recess portion has
   i) an arcuate surface, said coil expander being in contact with said arcuate surface, or
   ii) a plurality of surfaces, at least one surface of said plurality of surfaces being axially inclined from said resin ring and another surface of said plurality of surfaces being a surface axially parallel or perpendicular to said resin ring, said coil expander being in contact with said inclined surface, and
   wherein the coil expander does not contact the bottom of said seal ring groove, the resin ring contacts only one wall of the groove, the coil expander does not contact said one wall but contacts another wall of the groove, and the resin ring does not contact said another wall of the groove.
2. The seal device according to claim 1, wherein said resin ring is made of a fluororesin.
3. The seal device according to claim 2, wherein an inner diameter of said resin ring is 95-99.5% of a diameter of said inner member.
4. The seal device according to claim 1, wherein said recess portion has the arcuate surface.

5. The seal device according to claim 1, wherein said recess portion has the plurality of surfaces, said at least one surface of said plurality of surfaces being axially inclined from said resin ring, said another surface of said plurality of surfaces being said surface axially parallel or perpendicular to said resin ring, and said coil expander being in contact with said inclined surface.

6. The seal device according to claim 1, wherein said coil expander does not project inwardly from the inner peripheral surface of said resin ring.

7. The seal device according to claim 1, wherein an opening width (w) of said recess portion on the inner peripheral surface of said resin ring is 75% or less of a width (h1) of said resin ring.

8. The seal device according to claim 1, wherein the coil expander does not contact the bottom of said seal ring groove.

9. A seal device comprising a combined seal ring disposed in a seal ring groove of an outer peripheral surface of an annular inner member opposing an inner peripheral surface of an annular outer member, to achieve an oil seal between said outer member and said inner member;

said combined seal ring comprising an endless resin ring having an outer peripheral surface in slidable contact with the inner peripheral surface of the outer member, and a coil expander pushing said resin ring toward its outer peripheral surface and a side surface;

said coil expander being arranged in a corner recess portion of said resin ring between a pressure-receiving side surface and an inner peripheral surface of said resin ring;

the inner peripheral surface of said resin ring facing a bottom of said seal ring groove; and a most inner peripheral side of said combined seal ring facing but being apart from the bottom of said seal ring groove, wherein the corner recess portion is a recess which adjoins the pressure-receiving side surface but is spaced from a side surface of the resin ring opposite the pressure-receiving side surface, wherein said recess portion has a plurality of surfaces, at least one surface of said plurality of surfaces being axially inclined from said resin ring and another surface of said plurality of surfaces being a surface axially parallel or perpendicular to said resin ring, said coil expander being in contact with said inclined surface, and wherein the coil expander does not contact the bottom of said seal ring groove, the resin ring contacts only one wall of the groove, the coil expander does not contact said one wall but contacts another wall of the groove, and the resin ring does not contact said another wall of the groove.

* * * * *